United States Patent Office 2,792,405
Patented May 14, 1957

2,792,405

SUBSTITUTED POLYHYDROBENZ [CD] INDOLES AND PROCESS FOR THEIR PREPARATION

Edmund C. Kornfeld, Indianapolis, Ind., assignor to Eli Lilly and Company, Indianapolis, Ind., a corporation of Indiana No Drawing. Application October 13, 1954, Serial No. 462,105

32 Claims. (Cl. 260—319)

This invention relates to novel organic compounds and more particularly to substituted 1,2,2a,3,4,5-hexahydrobenz[cd]indoles and the process for their preparation.

The bases of the substituted polyhydrobenz[cd]indoles of this invention are represented by the formula

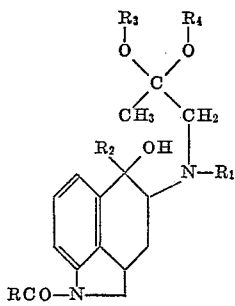

wherein R represents a radical of the group consisting of aliphatic radicals having from one to eight carbon atoms, monocarbocyclic aromatic, and monocarbocyclic aromatic-substituted lower alkyl radicals; $R_1$ represents an alkyl radical having from one to eight carbon atoms; $R_2$ represents a lower acyloxymethyl or hydroxymethyl radical; $R_3$ and $R_4$ each represents a lower alkyl radical, and when taken together, $R_3$ and $R_4$ represent a polymethylene chain having from two to three carbon atoms.

Broadly speaking, this invention also comprehends certain substituted polyhydrobenz[cd]indoles which are intermediates in preparation of the above compounds. These intermediate compounds can be prepared by epoxidation of correspondingly substituted 1,2,2a,3-tetrahydrobenz[cd]indoles. The epoxidation can be conveniently effected by means of per-acids, such as perbenzoic acid, monoperphthalic acid, peracetic acid and the life.

The substituted polyhydrobenz[cd]indoles according to the above formula are useful intermediates in the preparation of lysergic acid. Thus, they can be converted to the correspondingly substituted 5-keto-4-(N-alkyl-N-acetonyl) - amino - 1,2,2a,3,4,5 - hexahydrobenz[cd]-indole ketals, from which, by following the process of copending application Serial No. 458,674, there is obtained lysergic acid. As is known to the art, lysergic acid can be converted to certain ergot alkaloids which are useful oxytocics.

The following series of equations, wherein R has the same significance as hereinabove and alk represents a lower alkyl radical, illustrates the preparation of certain of the new substitued N-acyl-polyhydrobenz[cd]indoles and intermediates thereof, and their conversion to 1-acyl-5 - keto - 4 - (N - alkyl - N - acetonyl) - amino-1,2,2a,3,4,5 - hexahydrozenz[cd]indole ethylene ketal. The starting material for the reactions is an N-acyl-5-formyl - 1,2,2a,3-tetrahydrobenz[cd]indole, the preparation and properties of which are described in U. S. Patent No. 2,663,714.

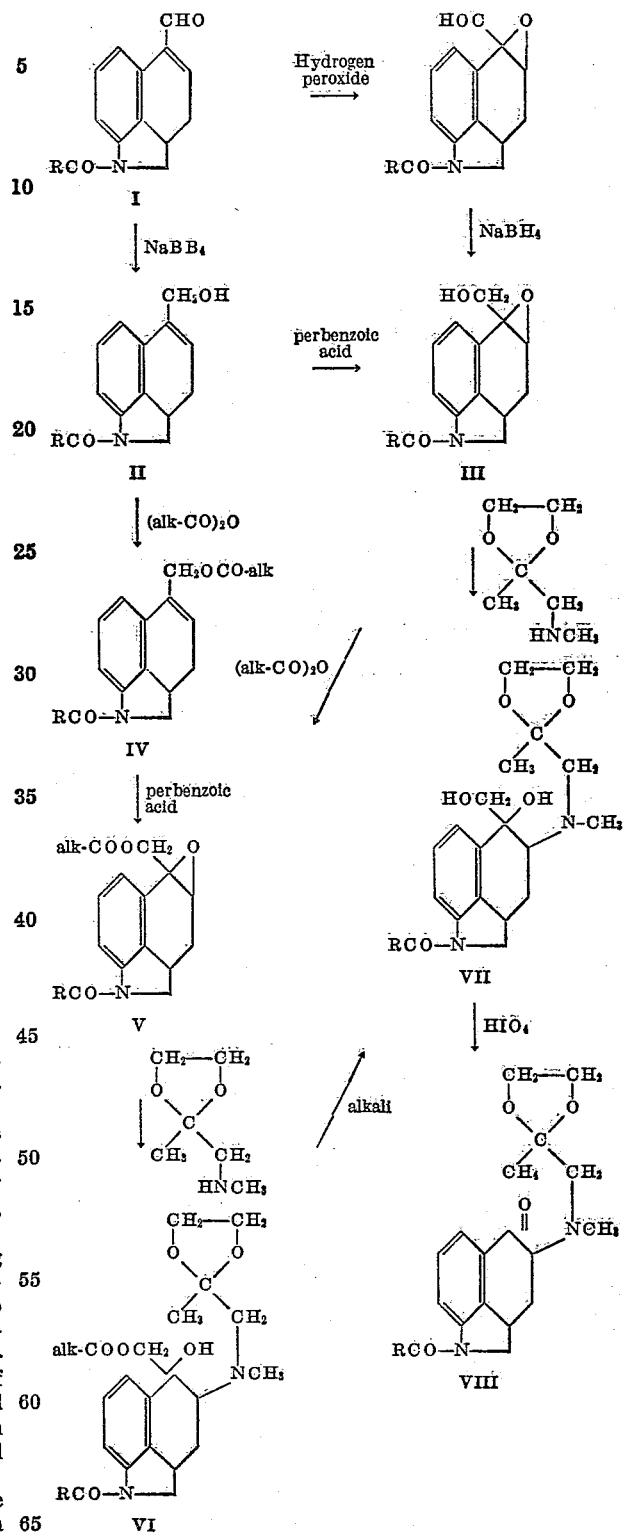

Referring to the equations, it will be seen that an N-acyl - 5 - formyl - 1,2,2a,3 - tetrahydrobenz[cd]indole (I) is converted to the corresponding N-acyl-5-hydroxymethyl-1,2,2a,3-tetrahydrobenz[cd]indole (II) which upon treatment with perbenzoic acid forms the corresponding epoxy derivative (III). Compound II upon treatment with an acylating agent, such as an acid anhydride, forms the corresponding 5-acyloxymethyl compound (IV), which upon treatment with perbenzoic acid forms the corresponding N-acyl - 4,5 - epoxy - 5 - acyloxymethyl-1,2,2a,3,4,5-hexahydrobenz[cd]indole (V). Compound III, when reacted with an alkylaminoacetone ketal, herein exemplified by methylaminoacetone ethylene ketal, forms an N-acyl-4-(N-methyl-N-acetonyl)-amino-5-hydroxy - 5 - hydroxymethyl - 1,2,2a,3,4,5 - hexahydrobenz[cd]indole ethylene ketal (VII), which upon treatment with periodic acid forms an N-acyl-4-(N-methyl-N-acetonyl) - amino - 5 - keto - 1,2,2a,3,4,5 - hexahydrobenz[cd]indole ethylene ketal (VIII). Likewise, Compound V is converted by treatment with methylaminoacetone ethylene ketal to an N-acyl-4-(N-methyl-N-acetonyl) - amino - 5 - hydroxy - 5 - acyloxymethyl-1,2,2a,3,4,5 - hexahydrobenz[cd]indole ethylene ketal (VI), which on hydrolysis and oxidation forms an N-acyl - 4 - (N - methyl - N - acetonyl) - amino - 5 - keto-1,2,2a,3,4,5 - hexahydrozenz[cd]indole ethylene ketal (VIII).

Alternatively, Compound I can be epoxidized by treatment with alkaline hydrogen peroxide to form an N-acyl-5-formyl-4,5-epoxy-1,2,2a,3,4,5- hexahydrobenz[cd] indole, which on reduction with sodium borohydride affords Compound III. Other variations in the course of the processes disclosed herein will be apparent to the art, such as combination of successive reaction steps where by-products of reaction are eliminated or are non-interfering with succeeding manipulations, and the like.

This invention is further illustrated by the following examples.

EXAMPLE 1

*Preparation of 1-benzoyl-4,5-epoxy-5-formyl-1,2,2a,3,4,5-hexahydrobenz[cd]indole*

32.4 g. (0.83 gram atom) of potassium were dissolved in a mixture of 800 ml. of dry tertiary butanol and 700 ml. of dry benzene maintained under nitrogen. The solvents were removed in vacuo, and the potassium t-butoxide was suspended in 1500 ml. of a mixture of equal volumes of dry benzene and dry toluene. The mixture was maintained under an atmosphere of nitrogen, and cooled in an ice bath, and to it were added 136 g. (0.49 mol) of 1-benzoyl-5-keto-1,2,2a,3,4,5-hexahydrobenz[cd]indole prepared according to the procedure of U. S. Patent No. 2,663,714. To the mixture, while being cooled in the ice bath, 106 g. (0.86 mol) of ethyl chloroacetate were added dropwise with stirring over a period of ten minutes. The cold solution was stirred for fifteen minutes, and finally was heated and refluxed for fifteen minutes. The mixture was cooled rapidly and treated with a few hundred grams of ice. The aqueous layer was separated, and the organic layer was washed successively with 1 liter of water, 1 liter of 1.5 N sulfuric acid, 1 liter of 0.7 N sulfuric acid, 1 liter of water and 1 liter of saturated sodium bicarbonate solution. The solution was dried over anhydrous magnesium sulfate, and the solvents were evaporated in vacuo. The syrupy glycidic ester remaining was dissolved in 1200 ml. of absolute ethanol, and to the solution were added slowly with shaking 65 ml. of 50 percent sodium hydroxide solution. The mixture was allowed to stand for twenty minutes after which it was heated rapidly to 70–75° and held there for five minutes, and then cooled for about one hour. The sodium salt of 1-benzoyl-5-carboxymethyl-5, α-epoxy-1,2,2a,3,4,5-hexahydrobenz[cd]indole which separated was filtered off, washed with methanol and ether, and dried. The salt melted with decomposition at about 220–223° C.

5 g. (0.014 mol) of the sodium salt of 1-benzoyl-5-carboxymethyl-5,α-epoxy - 1,2,2a,3,4,5 - hexahydrobenz[cd]indole was mixed with 100 ml. of dimethylformamide. To the mixture were added 4.5 g. (0.014 mol) of pyridine hydrobromide perbromide. The mixture was warmed to 60° and was then allowed to stand at room temperature for three and one half hours. To it was added a previously prepared solution of 4.2 g. of semicarbazide hydrochloride and 3.6 g. (0.042 mol) of anhydrous sodium acetate in 35 ml. of dimethyl formamide, and the mixture was heated on a steam bath for one hour. The dimethylformamide was evaporated in vacuo, the dark syrupy residue was treated with water, and the amorphous product which separated was filtered, and washed well with water. The precipitate was dissolved in a minimum of hot glacial acetic acid, the solution was treated with decolorizing carbon, and diluted with two volumes of methanol. After chilling to about 5° C. for a few hours a crystalline precipitate of the semicarbazone of 1-benzoyl-5-formyl-1,2,2a,3-tetrahydrobenz[cd]indole separated. The precipitate was filtered off and washed with small amounts of methanol and ether. The semicarbazone of 1-benzoyl-5-formyl-1,2,2a,3-tetrahydrobenz[cd]indole melted with decomposition at about 232–233° C.

22.9 g. of the semicarbazone of 1-benzoyl-5-formyl-1,2,2a,3-tetrahydrobenz[cd]indole were mixed with 160 g. of redistilled pyruvic acid, 230 ml. of chloroform and 10 ml. of water. The solution was shaken until homogeneous and allowed to stand overnight. It was diluted with 200 ml. of chloroform and washed with three 300 ml. portions of water and with two 300 ml. portions of saturated sodium bicarbonate solution. The chloroform solution was dried over anhydrous magnesium sulfate, treated with decolorizing carbon, and concentrated to dryness in vacuo. The crystalline residue of 1-benzoyl-5-formyl-1,2,2a,3-tetrahydrobenz[cd]indole was digested with 100 ml. of hot ethanol, cooled, filtered, and washed with methanol and ether. The yield was 16.1 g., 65 percent of theory. It melted at about 171–174° C. After recrystallization of a sample from ethanol, it melted at about 177–178° C.

A solution of 43.2 g. of 1-benzoyl-5-formyl-1,2,2a,3-tetrahydrobenz[cd]indole in 5.6 liters of methanol was cooled to about 5° C. To the cooled solution were added slowly and with stirring 530 ml. of previously cooled 30 percent hydrogen peroxide, with stirring and continued cooling in ice. After all of the hydrogen peroxide had been added, 77 ml. of 5 percent aqueous sodium carbonate solution was added, after which stirring was continued for about six hour. To the reaction mixture were then added 6 liters of cold water followed by 4.5 ml. of glacial acetic acid. The reaction mixture was reduced to about one half its volume by evaporation of the alcohol in vacuo, and to the concentrated solution distilled water was added slowly and with stirring, until the solution became cloudy. The reaction mixture was cooled overnight and the precipitate which resulted, comprising 1-benzoyl-5-formyl-4,5-epoxy-1,2,2a,3,4,5-hexahydrobenz[cd]indole, was removed by filtration and crystallized from methanol.

1-benzoyl-5-formyl-4,5-epoxy-1,2,2a,3,4,5 - hexahydrobenz[cd]indole thus prepared melted with decomposition at about 140–143° C. After recrystallization from wet methanol the product in the form of its monohydrate melted with decomposition at about 145–147° C.

EXAMPLE 2

*Preparation of 1-benzoyl-4,5-epoxy-5-hydroxymethyl-1,2,2a,3,4,5-hexahydrobenz[cd]indole*

To a stirred solution of 7.32 g. of sodium borohydride in 330 ml. of absolute ethanol was added a solution of 76.5 g. of 1-benzoyl-5-formyl-1,2,2a,3-tetrahydrobenz[cd]indole, prepared according to the procedure of Example 1 in 350 ml. of hot dioxane. The addition required about twenty minutes, and the warm reaction mixture was stirred for a further period of about two hours. Eight hundred ml. of water were added to the reaction mixture, whereupon a precipitate of 1-benzoyl-5 - hydroxymethyl - 1,2,2a,3 - tetrahydrobenz[cd]indole formed. It was removed by filtration and washed with acetone. 1-benzoyl-5-hydroxymethyl-1,2,2a,3-tetrahydrobenz[cd]indole monohydrate thus prepared melted with decomposition at about 108–110° C.

To a solution of 3.5 g. of perbenzoic acid in 70 ml. of cold chloroform were added 6 g. of 1-benzoyl-5-hydroxymethyl-1,2,2a,3-tetrahydrobenz[cd]indole. The resulting solution was allowed to stand in a refrigerator for about seventeen hours, and then was washed with two 30 ml. portions of saturated aqueous sodium bicarbonate solution. The washed chloroform solution was dried over anhydrous magnesium sulfate, and evaporated to dryness in vacuo. The residue was crystallized from methanol. The 1-benzoyl-4,5-epoxy-5-hydroxymethyl - 1,2,2a,3,4,5-hexahydrobenz[cd]indole thus prepared melted at about 175–176° C.

Other 1-acyl derivatives of 5-formyl-1,2,2a,3-tetrahydrobenz[cd]indole can be employed in the reduction procedure of this example to yield the corresponding 1-acyl-5-hydroxymethyl - 1,2,2a,3 - tetrahydrobenz[cd]indoles. Thus for example, in place of the 1-benzoyl derivatives, 1-propionyl, 1-caproyl, 1-n-heptanoyl, 1-acetyl, 1-phenylacetyl and the like acyl derivatives of 5-formyl-1,2,2a,3-tetrahydrobenz[cd]indole can be reduced to form the corresponding 1-propionyl, 1-caproyl, 1-heptanoyl, 1-acetyl, and 1-phenylacetyl-5-hydroxymethyl-1,2,2a,3-tetrahydrobenz[cd]indoles, respectively. Instead of the sodium borohydride employed for reduction in the procedure of this example, other mild hydrogenating agents can be used, as for example, zinc and acids, lithium borohydride, hydrogen with catalyst such as palladium black and the like.

The reduction can be effected at temperatures ranging from about room temperature to 150° C., or higher, but the formation of undesirable by-products increases rapidly at higher temperatures.

The 1-acyl-5-hydroxymethylpolyhydrobenz[cd]indoles can be epoxidized by means of any per-acid, such as peracetic acid, monoperphthalate acid, and the like.

EXAMPLE 3

*Preparation of methylaminoacetone ethylene ketal*

A mixture of 1200 ml. of liquid methylamine and 300 g. of chloroacetone ethylene ketal was heated in a high pressure autoclave at 160–165° C. for about twenty-five hours. The reaction mixture was cooled and the excess methylamine was evaporated. The residue, comprising methylaminoacetone ethylene ketal, was dissolved in several volumes of ether. The ether solution was mixed with a solution of 130 g. of potassium hydroxide in 65 ml. of water, and was decanted from the sludge. The ethereal extract containing methylaminoacetone ethylene ketal formed in the reaction was dried over solid potassium hydroxide, the ether was removed by evaporation, and the residue was distilled. The portion boiling at 158–161° C. was collected, was dissolved in two liters of dry ether, and dry hydrogen chloride gas was passed into the solution until precipitation of the hydrochloric acid addition salt of the base complete. The methylaminoacetone ethylene ketal hydrochloride thus prepared melted at about 165–167° C. It can be represented by the formula

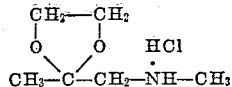

The methylaminoacetone ethylene ketal hydrochloride was suspended in 1 liter of dry ether, and to the mixture was added with stirring a solution of 110 g. of potassium hydroxide in 55 ml. of water. Sufficient excess solid potassium hydroxide was added to remove all water, and the organic layer was decanted, and the ether was evaporated. The residue was distilled yielding methylaminoacetone ethylene ketal which boiled at about 158–159° C.

In the place of the methylamine used above, other amines having from two to eight carbon atoms can be used in the process. Thus, by employing ethylamine, isopropylamine, butylamine and n-heptylamine in the process of this example the corresponding ethylaminoacetone ethylene ketal, isopropylaminoacetone ethylene ketal, butylaminoacetone ethylene ketal and n-heptylaminoacetone ethylene ketal, respectively, are produced. Similarly, other ketals, such as chloroacetone propylene ketal, can be employed to produce the corresponding aminoacetone ketals, as for example, methylaminoacetone propylene ketal. The aminoacetone ketals described are suitable for use in the process of the invention as exemplified by the following example. Likewise, aminoacetone dialkyl ketals, wherein the amino group can be substituted with an alkyl radical having from one to eight carbon atoms, such as methylaminoacetone diethyl ketal, isopropylaminoacetone diethyl ketal, amylaminoacetone diethyl ketal, n-heptylaminoacetone dipropyl ketal and the like, can be used in the procedure of the following examples to produce the corresponding 1-benzoyl-5-keto-4-(N-alkyl-N-acetonyl) - amino - 1,2,2a,3,4,5 - hexahydrobenz[cd]indole dialkyl ketals.

EXAMPLE 4

*Preparation of 1-benzoyl-5-hydroxy-5-hydroxymethyl-4- (N - methyl-N-acetonyl)-amino-1,2,2a,3,4,5-hexahydrobenz[cd]indole ethylene ketal*

A mixture of 12 g. of 1-benzoyl-4,5-epoxy-5-hydroxymethyl-1,2,2a,3,4,5-hexahydrobenz[cd]indole and 50 ml. of methylaminoacetone ethylene ketal was heated under nitrogen in an oil bath at about 125° C. for about sixteen hours. The excess amino ketal was removed by distillation in vacuo, and the residue was taken up in the minimum amount of benzene. By addition of petroleum ether to the benzene solution, a gummy precipitate of 1-benzoyl-5-hydroxy-5-hydroxymethyl-4-(N-methyl-N - acetonyl) - amino-1,2,2a,3,4,5, - hexahydrobenz[cd]indole ethylene ketal was formed. The supernatant liquid was removed by decantation, and the gum was dissolved in 25 ml. of chloroform. The chloroform solution was washed with three 25 ml. portions of cold dilute hydrochloric acid to remove all of the basic material. The combined acid extracts were neutralized by the addition of sodium bicarbonate, and the neutral aqueous solution was extracted with three 50 ml. portions of chloroform. The combined chloroform extracts were dried over anhydrous magnesium sulfate, and the chloroform was removed by evaporation in vacuo. The residue was crystallized from ethyl acetate.

1-Benzoyl-5-hydroxy-5-hodroxymethyl-4-(N - methyl - N-acetonyl - amino - 1,2,2a,3,4,5 - hexahydrobenz[cd]indole ethylene ketal thus prepared melted at about 148–150° C.

By using 1-benzoyl-5-acetoxymethyl-4,5,-epoxy-1,2,2a,-3,4,5-hexyhydrobenz[cd]indole as a starting material in the procedure of this example, there is obtained 1-benzoyl-5-hydroxy-5-acetoxymethyl-4-(N-methyl-N - acetonyl) - amino-1,2,2a,3,4,5, - hexahydrobenz[cd]indole ethylene ketal melting at about 130–132° C.

A solution consisting of 1 g. of 1-benzoyl-5-hydroxy-5-hydroxymethyl - 4 - (N-methyl-N-acetonyl)-amino-1,2,2a,3,4,5,-hexahydrobenz[cd]indole ethylene ketal and 20 ml. of ethanol is treated with a slight excess of anhydrous hydrogen chloride gas. Sufficient ether is added to the resulting solution to bring about precipitation of the 1-benzoyl-5-hydroxy-5-hydroxymethyl-4-(N-methyl - N - acetonyl)-amino - 1,2,2a,3,4,5 - hexahydrobenz[cd]indole ethylene ketal hydrochloride which is formed in the reaction. The precipitate is removed by filtration, washed with ether, and crystallized from a mixture of ethanol and ether. It melts with decomposition at about 230–235° C.

Similarly, when 1-benzoyl-5-hydroxy-5-acetoxymethyl-4-(N-methyl-N-acetonyl)-amino-1,2,2a,3,4,5 - hexahydrobenz[cd]indole ethylene ketal is treated in the same manner with a slight excess over the equivalent amount of hydrogen chloride, the corresponding 1-benzoyl-5-hydroxy-5-acetoxymethyl-4-(N-methyl-N-acetonyl)-amino - 1,2,2a,3,4,5-hexahydrobenz[cd]indole ethylene ketal hydrochloride, melting with decomposition at about 250° C., is obtained. Other acids as, for example, hydrobromic acid, sulfuric acid, phosphoric acid, and the like can be employed to produce the corresponding acid addition salts of the 1-acyl-polyhydrobenzindole amino ketals.

When other acylated 5-hydroxymethyl-4,5,-epoxy-1,-2, 2a,3,4,5-hexahydrobenz[cd]indoles, such as are disclosed in Example 2, are employed in the procedure of this example, corresponding N-acyl-5-hydroxy-5-hydroxymethyl-4-methylacetonylamino-1,2,2a,3,4,5 - hexahydrobenz[cd]indole ethylene ketals are produced. Thus there are prepared 1-acetyl-5-hydroxy-5-hydroxymethyl-4-(N-methyl-N-acetonyl)-amino-1,2,2a,3,4,5, - hexahydrobenz[cd]indole ethylene ketal, 1-phenylacetyl-5-hydroxy-5-hydroxymethyl-4-(N-methyl-N-acetonyl) - amino-1,2,2a,3,4,5-hexahydrobenz[cd]indole ethylene ketal, 1-n-heptanoyl-5-hydroxy-5-hydroxymethyl-4-(N - methyl-N-acetonyl)-amino-1,2,2a,3,4,5 - hexahydrobenz[cd]indole ethylene ketal and 1-n-valeryl-5-hydroxy-5-hydroxymethyl - 4 - (N - methyl-N-acetonyl)-amino-1,2,2a,3,4,5-hexahydrobenz[cd]indole ethylene ketal. Acid addition salts of these compounds are prepared in the same manner as described hereinabove.

Likewise, by employing other substituted alkylaminoacetone ketals disclosed in Example 3, the corresponding 1-benzoyl-5-hydroxy-5-hydroxymethyl-4-(N-ethyl - N - acetonyl)-amino-1,2,2a,3,4,5 - hexahydrobenz[cd]indole ethylene ketal, 1-benzoyl-5-hydroxy-5-hydroxymethyl-4-(N-butyl-N-acetonyl)-amino - 1,2,2a,3,4,5-hexahydrobenz[cd]indole ethylene ketal, 1-benzoyl-5-hydroxy-5-hydroxymethyl-4-(N-n-heptyl-N-acetonyl) - amino - 1,2,2a,3,4,5-hexahydrobenz[cd]indole ethylene ketal, 1-benzoyl-5-hydroxy-5-hydroxymethyl-4-(N-methyl-N - acetonyl) - amino-1,2,2a,3,4,5 - hexahydrobenz[cd]indole propylene ketal, 1-benzoyl - 5-hydroxy-5-hydroxymethyl-4-(N-isopropyl-N-acetonyl)-amino - 1,2,2a,3,4,5 - hexahydrobenz[cd]indole diethyl ketal and 1-benzoyl-5-hydroxy-5-hydroxylmethyl-4-(N-amyl-N-acetonyl) - amino - 1,2,2a,3,4,5-hexahydrobenz[cd]indole dipropyl ketal are obtained. These substances are also converted to their acid addition salts in the same manner as described hereinabove.

The temperature at which the reaction is carried out can be varied over a range of about 50 to about 150° C. Generally speaking the reaction is more rapid at the higher temperatures.

Inert organic solvents other than those described can likewise be employed, such as toluene, xylene and the like.

EXAMPLE 5

*Preparation of 1-benzoyl - 5 - keto-4-(N-methyl-N-acetonyl)-amino - 1,2,2a,3,4,5 - hexahydrobenzyl[cd]indole ethylene ketal*

To a mixture of 0.88 g. (0.002 mol of 1-benzoyl-5-hydroxy - 5 - hydroxymethyl - 4 - (N - methyl - N-acetonyl) - amino - 1,2,2a,3,4,5 - hexahydrobenz[cd]indole ethylene ketal, 0.44 g. (0.0022 mol) of sodium periodate and 10 ml. of water are added 0.2 ml. of concentrated sulfuric acid. The mixture is shaken occasionally while standing at room temperature for about one half hour. The resulting solution is neutralized with sodium bicarbonate whereupon an amorphous precipitate of 1-benzoyl-5-keto-4-(N-methyl-N-acetonyl)-amino-1,2,-2a,3,4,5 - hexahydrobenz[cd]indole ethylene ketal is formed, which is filtered off, washed with water, and recrystallized from the minimum amount of warm acetone. It melts at about 135–136° C.

In carrying out the oxidation procedure of this example, other oxidizing agents, for example lead tetraacetate, can be used.

EXAMPLE 6

*Preparation of 1-benzoyl-4,5-epoxy-5-acetoxymethyl-1,2-2a,3,4,5-hexahydrobenz[cd]indole*

Two grams of 1-benzoyl-5-hydroxymethyl-1,2,2a,3-tetrahydrobenz[cd]indole hydrate prepared according to the procedure of Example 1 were dried at about 120° C. in vacuo. The resulting amorphous product was dissolved in 10 ml. of acetic anhydride and six drops of boron fluoride etherate were added thereto. The mixture was allowed to stand at room temperature for about three days, and then was concentrated in vacuo at a temperature below about 40° C. The residue was dissolved in chloroform, and the chloroform solution was washed with aqueous 5 percent sodium bicarbonate solution. The chloroform solution was dried over anhydrous magnesium sulfate, and the chloroform was removed by evaporation in vacuo. The residue, consisting of 1-benzoyl - 5 - acetoxymethyl - 1,2,2a,3 - tetrahydrobenz[cd]indole, was crystallized from a mixture of ethyl acetate and petroleum ether, and was found to melt at about 95–98° C. 1-benzoyl-5-acetoxymethyl-1,2,2a,3-tetrahydrobenz[cd]indole was treated with perbenzoic acid according to the procedure of Example 2. The 1-benzoyl - 4,5 - epoxy - 5 - acetoxymethyl - 1,2,2a,3,4,5-hexahydrobenz[cd]indole thus prepared was found to melt at about 177–179° C.

The function of the boron trifluoride etherate is merely that of a catalytic agent. It can be omitted from the reaction, although the yield is then somewhat smaller, and the reaction mixture must be permitted to stand for longer periods of time, or heated to temperatures in the range of about 35–100° C.

Other acylating agents can be employed to effect the acylation procedure of this example. Thus, for example, propionic anhydride, butyric anhydride, valeric anhydride and the like can be employed to produce lower acyloxy derivatives of 1-benzoyl-4,5-epoxy-5-hydroxymethyl-1,2,-2a,3,4,5-hexahydrobenz[cd]indole. Other 1-acyl-5-hydroxymethyl-polyhydrobenz indoles, as described in Example 2, can be employed in the procedure of this example to prepare the corresponding 1-acyl-5-acyloxymethyl-polyhydrobenz[cd]indoles.

EXAMPLE 7

*Preparation of 1-benzoyl-4,5-epoxy-5-hydroxymethyl-1,2,2a,3,4,5-hexahydrobenz[cd]indole from 1-benzoyl-4,5 - epoxy - 5 - formyl - 1,2,2a,3,4,5 - hexahydrobenz[cd]indole*

A solution of 48.4 g. of 1-benzoyl-5-formyl-4,5-epoxy-1,2,2a,3,4,5-hexahydrobenz[cd]indole hydrate prepared according to the procedure of Example 1 in 180 ml. of hot dioxane is added with stirring to a hot solution of 4.13 g. of sodium borohydride in 180 ml. of ethanol. The mixture is stirred for about one half hour and 500 ml. of water are added. The resulting cloudy suspension is cooled, and the precipitate, consisting of 1-benzoyl-4,5-epoxy - 5 - hydroxymethyl - 1,2,2a,3,4,5 - hexahydrobenz[cd]indole, is removed by filtration, and after crystallization from methanol it melts at about 175–179° C.

EXAMPLE 8

*Preparation of 1-benzoyl-4,5-epoxy-5-acetoxymethyl-1,2,-2a,3,4,5-hexahydrobenz[cd]indole from 1-benzoyl-4,5-epoxy - 5 - hydroxymethyl - 1,2,2a,3,4,5 - hexahydrobenz[cd]indole*

A solution of 3 g. of 1-benzoyl-4,5-epoxy-5-hydroxymethyl-1,2,2a,3,4,5-hexahydrobenz[cd] indole in about 15 ml. of acetic anhydride is warmed gently for about sixteen hours on a water bath, and then concentrated in vacuo. The residue is dissolved in about 50 ml. of chloroform, and the chloroform solution is washed with about 10 ml. of saturated sodium bicarbonate solution. The chloroform solution is dried over anhydrous magnesium sulfate, and the chloroform removed by evaporation in vacuo. The residue, consisting of 1-benzoyl-5-acetoxymethyl - 4,5 - epoxy - 1,2,2a,3,4,5 - hexahydrobenz[cd]indole, melts at about 176–178° C. after recrystallization from methanol.

EXAMPLE 9

*Preparation of 1-benzoyl-5-hydroxy-5-hydroxymethyl-4- (N - methyl - N - acetonyl) - amino - 1,2,2a,3,4,5- hexahydrobenz[cd]indole ethylene ketal from 1-benzoyl - 5 - hydroxy - 5 - acetoxymethyl - 4 - (N - methyl-N - acetonyl) - amino - 1,2,2a,3,4,5 - hexahydrobenz-[cd]indole ethylene ketal*

To a solution of 1 g. of 1-benzoyl-5-hydroxy-5-acetoxymethyl - 4 - (N - methyl - N - acetonyl) - amino - 1,2,-2a,3,4,5-hexahydrobenz[cd]indole ethylene ketal in 25 ml. of a mixture of equal parts of ethanol and water is added 1 molecular equivalent of sodium hydroxide. The reaction mixture is kept at room temperature for about sixteen hours whereupon mild hydrolysis takes place removing the acetyl radical from the 5-acetoxymethyl group. The reaction mixture is treated with 50 ml. of water, and the resulting precipitate is removed by filtration and washed with water. The precipitate, consisting of 1-benzoyl-5-hydroxy-5-hydroxymethyl-4-(N-methyl-N-acetonyl) - amino - 1,2,2a,3,4,5 - hexahydrobenz[cd]-indole ethylene ketal, is crystallized from ethyl acetate.

Alternatively, the product of the hydrolysis is not isolated, but instead, a slight excess over the calculated molecularly equivalent amount of sodium periodate is added to the aqueous reaction mixture from hydrolysis. The alkaline reaction mixture is then acidified by the addition of concentrated sulfuric acid, and by following the procedure of Example 5, 1-benzoyl-5-keto-4-(N-methyl-N - acetonyl) - amino - 1,2,2a,3,4,5-hexahydrobenz[cd]indole ethylene ketal is obtained, melting at about 135–136° C. after crystallization from warm acetone.

I claim:

1. In the process of preparing an alkylaminoacetone-ketal-substituted 5-keto-polyhydrobenz[cd]indole having the formula

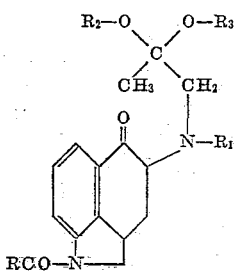

wherein R represents a radical of the group consisting of alkyl radicals having from one to eight carbon atoms, monocarbocyclic aromatic, and monocarbocyclic aromatic-substituted lower alkyl radicals, $R_1$ represents an alkyl radical having from one to eight carbon atoms, $R_2$ and $R_3$ each represent a lower alkyl radical, and when taken together, $R_2$ and $R_3$ represent an alkylene chain having from two to three carbon atoms, the step which comprises heating together a polyhydrobenz[cd]indole epoxide represented by the formula

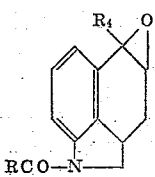

wherein R has the same significance as hereinabove and $R_4$ represents a member of the group consisting of hydroxymethyl and lower alkylcarboxyacyloxymethyl radical, and a ketal represented by the formula

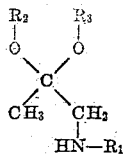

wherein $R_1$, $R_2$ and $R_3$ have the same significance as hereinabove.

2. The process step according to claim 1, wherein the polyhydrobenz[cd]indole epoxide is represented by the formula

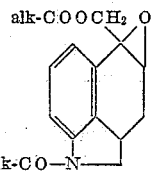

and the ketal is represented by the formula

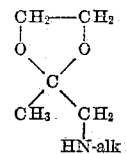

wherein alk signifies a lower alkyl radical.

3. The process step according to Example 1, wherein the polyhydrobenz[cd]indole epoxide is 1-benzoyl-5-hydroxymethyl - 4,5-epoxy-1,2,2a,3,4,5-hexahydrobenz[cd]-indole.

4. The process according to claim 1, wherein the polyhydrobenz[cd]indole epoxide is 1-benzoyl-5-acetoxymethyl-4,5-epoxy-1,2,2a,3,4,5-hexahydrobenz[cd]indole.

5. The process step according to claim 1, wherein the ketal is methylaminoacetone ethyleneketal.

6. In the process of preparing an alkylaminoacetone-ketal-substituted 5-keto-polyhydrobenz[cd]indole, the step which comprises reducing a polyhydrobenz[cd]indole represented by the formula

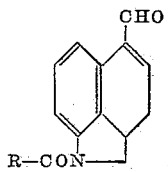

wherein R represents a radical of the group consisting of alkyl radicals having from one to eight carbon atoms, monocarbocyclic aromatic, and monocarbocyclic aromatic-substituted lower alkyl radicals to produce a 5-hydroxymethyl-acylated polyhydrobenz[cd]indole.

7. The process step according to claim 6, wherein the polyhydrobenz[cd]indole is 1-benzoyl-5-formyl-1,2,2a,3-tetrahydrobenz[cd]indole.

8. In the process of preparing an alkylaminoacetone-ketal-substituted 5-keto-polyhydrobenz[cd]indole, the step which comprises treating with a mild oxidizing agent a 5-hydroxymethylpolyhydrobenz[cd]indole represented by the formula

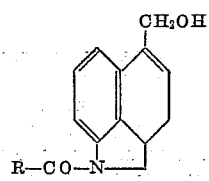

wherein R represents a radical of the group consisting of alkyl radicals having from one to eight carbon atoms, monocarbocyclic aromatic and monocarbocyclic aromatic-substituted lower alkyl radicals to produce the corresponding 4,5-epoxy-polyhydrobenz[cd]indole.

9. The process step according to claim 8, wherein the polyhydrobenz[cd]indole is 1 - benzoyl - 5 - hydroxymethyl-1,2,2a,3-tetrahydrobenz[cd]indole.

10. In the process of preparing an alkylaminoacetoneketal - substituted 5-keto-polyhydrobenz[cd]indole, the step which comprises subjecting to the action of a carboxyacylating agent a 5-hydroxymethyl-substituted polyhydrobenz[cd]indole represented by the formula

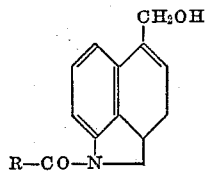

wherein R represents a radical of the group consisting of alkyl radicals having from one to eight carbon atoms, monocarbocyclic aromatic and monocarbocyclic aromatic-substituted lower alkyl radicals.

11. The process step according to claim 10, wherein the polyhydrobenz[cd]indole is 1 - benzoyl - 5 - hydroxymethyl-1,2,2a,3-tetrahydrobenz[cd]indole.

12. In the process of preparing an alkylaminoacetoneketal-substituted 5-keto-polyhydrobenz[cd]indole, the step which comprises subjecting to the action of an epoxidizing agent a substituted polyhydrobenz[cd]indole

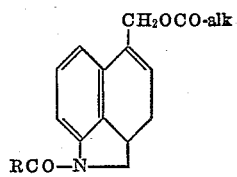

wherein alk represents a lower alkyl radical and R represents a radical of the group consisting of alkyl radicals having from one to eight carbon atoms, monocarbocyclic aromatic and monocarbocyclic aromatic-substituted lower alkyl radicals.

13. The process step according to claim 12 wherein the substituted polyhydrobenz[cd]indole is 1 - benzoyl - 5 - acetoxymethyl-1,2,2a,3-tetrahydrobenz[cd]indole.

14. In the process of preparing an alkylaminoacetoneketal - substituted 5 - keto - polyhydrobenz[cd]indole, the step which comprises subjecting to the action of an oxidizing agent of the group consisting of lead tetraacetate and periodic acid a polyhydrobenz[cd]indole represented by the formula

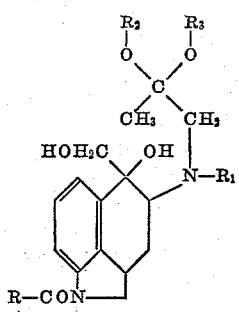

wherein R represents a radical of the group consisting of alkyl radicals having from one to eight carbon atoms, monocarbocyclic aromatic, and monocarbocyclic aromatic-substituted lower alkyl radicals, $R_1$ represents an alkyl radical having from one to eight carbon atoms, $R_2$ and $R_3$ each represent a lower alkyl radical and when taken together $R_2$ and $R_3$ represent an alkylene radical having from two to three carbon atoms.

15. The process step according to claim 14, wherein the polyhydrobenz[cd]indole is represented by the formula

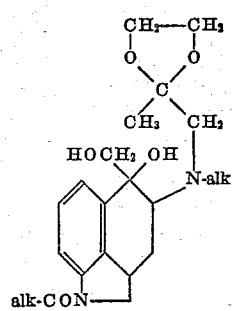

wherein alk represents a lower alkyl radical.

16. The process step according to claim 14, wherein the polyhydrobenz[cd]indole is 1 - benzoyl - 4 - (N-methyl - N - acetonyl) - amino - 5 - hydroxy - 5 - hydroxymethyl - 1,2,2a,3,4,5 - hexahydrobenz[cd]indole ethylene ketal.

17. In the process of preparing an alkylaminoacetoneketal - substituted 5 - keto - polyhydrobenz[cd]indole, the step which comprises subjecting to alkaline hydrolysis under mild conditions a polyhydrobenz[cd]indole represented by the formula

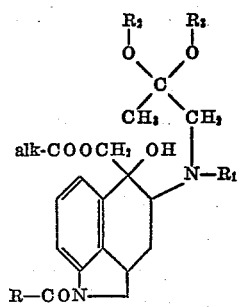

wherein R represents a radical of the group consisting of alkyl radicals having from one to eight carbon atoms, monocarbocyclic aromatic, and monocarbocyclic aromatic-substituted lower alkyl radicals, $R_1$ represents an alkyl radical having from one to eight carbon atoms, $R_2$ and $R_3$ each represent a lower alkyl radical and when taken together $R_2$ and $R_3$ represent an alkylene radical having from two to three carbon atoms, and alk represents a lower alkyl radical.

18. In the process for preparing an alkylaminoacetoneketal-substituted 5-keto-polyhydrobenz[cd]indole, the step which comprises carboxyacylating the hydroxymethyl group of a substituted polyhydrobenz[cd] indole represented by the formula

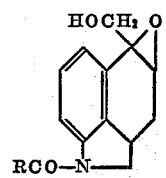

wherein R represents a member of the group consisting of alkyl radicals having from one to eight carbon atoms, monocarbocyclic aromatic and monocarbocyclic aromatic-substituted lower alkly radicals.

19. The process step according to claim 18, wherein the substituted polyhydrobenz[cd]indole is 1-benzoyl-5-hydroxymethyl - 4,5 - epoxy - 1,2,2a,3,4,5-hexahydrobenz[cd]indole.

20. A compound of the group consisting of N-carboxyacyl derivatives of a base, the said base being represented by the formula

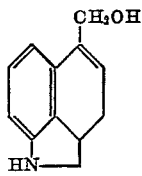

21. 1 - benzoyl - 5-hydroxymethyl-1,2,2a,3-tetrahydrobenz[cd]indole.

22. A compound selected from the group consisting of N-carboxyacyl derivatives of a base, the said base being represented by the formula

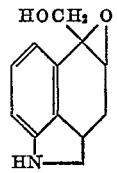

23. 1 - benzoyl-5-hydroxymethyl-4,5-epoxy-1,2,2a,3,4,5-hexahydrobenz[cd]indole.

24. A compound of the group consisting of N-carboxyacyl derivatives of a base, the said base being represented by the formula

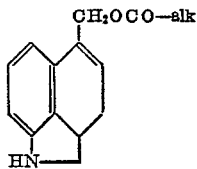

wherein alk represents a lower alkyl radical.

25. 1-benzoyl-5-acetoxymethyl-1,2,2a,3-tetrahydrobenz[cd]indole.

26. A compound of the group consisting of N-carboxyacyl derivatives of a base, the said base being represented by the formula

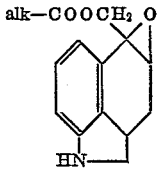

wherein alk represents a lower alkyl radical.

27. 1 - benzoyl - 5-acetoxymethyl-4,5-epoxy-1,2,2a,3,4,5-hexahydrobenz[cd]indole.

28. A compound of the group consisting of a base and the acid addition salts thereof, the said base being represented by the formula

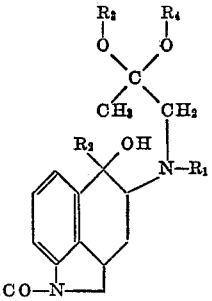

wherein R represents a radical of the group consisting of aliphatic radicals having from one to eight carbon atoms, monocarbocyclic aromatic, and monocarbocyclic aromatic-substituted lower alkyl radicals, $R_1$ represents an alkyl radical having from one to eight carbon atoms, $R_2$ represents a member of the group consisting of hydroxymethyl and lower acyloxymethyl radicals, $R_3$ and $R_4$ each represent a lower alkyl radical, and when taken together, $R_3$ and $R_4$ represent an alkylene chain having from two to three carbon atoms.

29. 1 - benzoyl - 4-(N-methyl-N-acetonyl)-amino-5-hydroxy - 5-hydroxymethyl-1,2,2a,3,4,5-hexahydrobenz[cd]-indole ethylene ketal.

30. 1 - benzoyl - 4-(N-methyl-N-acetonyl)-amino-5-hydroxy - 5-acetoxymethyl-1,2,2a,3,4,5-hexahydrobenz[cd]-indole ethylene ketal.

31. A compound of the group consisting of N-carboxyacyl derivatives of a base, the said base being represented by the formula

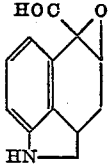

32. 1 - benzoyl - 4,5-epoxy-5-formyl-1,2,2a,3,4,5-hexahydrobenz[cd]indole.

References Cited in the file of this patent

Chemical Abstracts, vol. 45, 4237–8 (1951), citing Helv. Chim. Acta, vol. 33, pages 1796–1808, and 1955–1960 (1950).

Chemical Abstracts, vol. 46, pages 124 (1952), citing Helv., vol. 33, pages 2254–2256 (1950).

Chemical Abstracts, vol. 48, page 10032 (1954), citing Helv., vol. 36, pages 1125–1142 (1953).

Jour. Am. Chem. Soc., vol. 71, page 761 (1949).